Dec. 28, 1948. C. MARIASH 2,457,698
SUSPENDER WINDOW SUPPORT FOR WASHING WINDOWS
Filed May 18, 1946
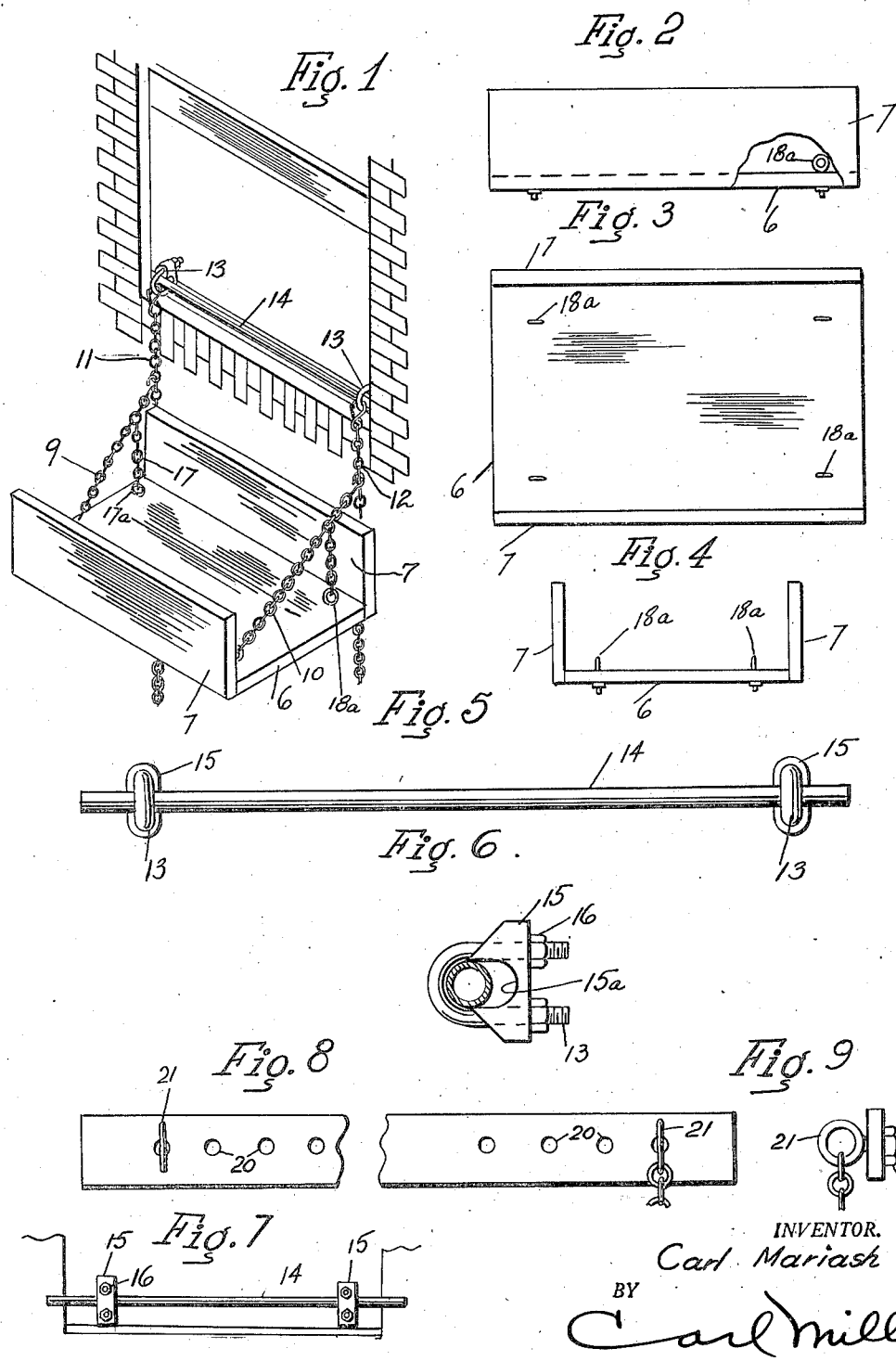
INVENTOR.
Carl Mariash
BY Carl Miller Patented Dec. 28, 1948

2,457,698

UNITED STATES PATENT OFFICE 2,457,698

SUSPENDER WINDOW SUPPORT FOR WASHING WINDOWS

Carl Mariash, Brooklyn, N. Y.

Application May 18, 1946, Serial No. 670,745

1 Claim. (Cl. 304—24)

This invention relates to a device for supporting a person outside of a window, so that the outer surfaces of the panes of the upper and lower sashes of the window may be safely cleaned, and one of its objects is to provide a device of this character with a cross bar capable of spanning the sides of a window frame, supporting chains connected with the cross bar and a platform carried by the supporting chains, and constructed to permit of vertical adjustment of the platform.

Another object of the invention is to provide the cross bar with clamps adjustable thereon for connecting the upper ends of the supporting chains thereto.

With the above and other objects in view, the invention comprises certain new and useful constructions, combinations and arrangements of parts, clearly described in the following specification, and fully illustrated in the drawings, in which:

Fig. 1 is a perspective view, showing the device in working position below a window.

Fig. 2 is a side view of the platform, partly broken away.

Fig. 3 is a top plan view thereof.

Fig. 4 is an end view thereof.

Fig. 5 is an enlarged side view of the cross bar and clamps.

Fig. 6 is a detail sectional view through the cross bar, showing the adjustable clamp.

Fig. 7 is a side view of the cross bar, showing the same from inside of the window.

Fig. 8 is a side view of a modified cross bar, shown broken away for convenience.

Fig. 9 is a detail end view thereof.

Referring to the drawings, which illustrate the practical embodiment of the invention, 5 designates a platform which is constructed with a base board 6, and parallel side board 7, suitably connected to each other.

A supporting chain 9 is extended through the base board 6, adjacent to the front side board 7, and another supporting chain 10 is extended through the base board 6 adjacent the front side board 7, but near the opposite end of the base board 6. Both of these chains are thus positively coupled to the base board 6, near opposite sides and ends thereof.

The chains 9 and 10 extend diagonally over the inner side board 7 of the platform and are connected to the vertical hanger chains 11 and 12, the upper ends of which are connected to the U-bolts 13, which are adjustably clamped to the end portions of the cross bar 14 by means of the friction block 15 and the nuts 16, the friction blocks 15 being formed with concave bearing faces 15a for this purpose.

A vertical chain length 17 is connected to the diagonal chain 9 and to the inner side of the base board 6 by means of the eye 17a, and another vertical chain 18 is connected to the diagonal chain 10 and to the eye 18a of the base board 6.

The ends of the cross bar are disposed against the sides of the window frame, so that the main body portion of the cross bar will straddle the opening of the window, after the sash has been raised.

When a person stands upon the platform 5 the entire weight of the person will be carried by the cross bar and the supporting chains, and the inner side board 8 of the platform will be forced against the side of the building, so as to provide the necessary stability to the person standing on the platform.

The elevation of the platform below the window may be varied by changing the connection between the diagonal chains 9 and 10 with the vertical chains 11 and 12, so that the person may more easily reach all surface areas of the window panes of the upper and lower window sashes.

By removing the cross bar from the window the entire suspended supporting device may be completely withdrawn from the window.

In Figs. 8 and 9 I show a modified form of a cross bar, which consists of a flat bar having spaced holes 20 to receive the eye bolts 21, which are clamped in place by means of the nuts 22. The upper ends of the hanger chains are connected to these eye bolts. By changing the location of the eye bolts in the holes 20 the cross bar may be adapted to different widths of windows.

It is understood that various changes in the details of construction, their combination and arrangement may be made, within the scope of the invention, as defined by the claim hereof.

Having described the invention, I claim as new and patentable:

A window support for cleaning windows from the outside, comprising a platform, first chains connected to the outer side of the platform near opposite ends thereof and extending inwardly and diagonally upwardly, chains each of a length correlated with the length of each side first chains connecting the diagonal chains to the inner sides of the platform, a hanger chain connected with the inner end of each diagonal chain, a cross bar connected with the upper ends of the hanger chains and adapted to bridge a window to support the platform in suspended position below the window and the cross bar having an adjustable U-bolt including concave bearing surfaces near each end thereof connected to the upper end of the nearest hanger chain.

CARL MARIASH.

REFERENCES CITED

The following references are of record in the file of this patent:

UNITED STATES PATENTS

| Number | Name | Date |
|---|---|---|
| 480,046 | Stauber | Aug. 2, 1892 |
| 724,799 | Buckel | Apr. 7, 1903 |
| 1,295,453 | Edland | Feb. 25, 1919 |
| 1,318,479 | Carter | Oct. 14, 1919 |
| 1,447,065 | Dwork | Feb. 27, 1923 |
| 1,630,626 | Menneiley | May 31, 1927 |
| 1,868,187 | Avallone | July 19, 1932 |
| 1,897,810 | Mallory et al. | Feb. 14, 1933 |
| 2,194,978 | Ireland | Mar. 26, 1940 |

FOREIGN PATENTS

| Number | Country | Date |
|---|---|---|
| 580,020 | Germany | July 4, 1933 |